US011429333B2

United States Patent
Meouchy et al.

(10) Patent No.: US 11,429,333 B2
(45) Date of Patent: Aug. 30, 2022

(54) IMMERSIVE DATA VISUALIZATION

(71) Applicant: BadVR, Inc., Los Angeles, CA (US)

(72) Inventors: Jad Meouchy, Los Angeles, CA (US); Suzanne Borders, Los Angeles, CA (US)

(73) Assignee: BadVR, Inc., Los Angeles, CA (US)

( * ) Notice: Subject to any disclaimer, the term of this patent is extended or adjusted under 35 U.S.C. 154(b) by 538 days.

(21) Appl. No.: 16/571,086

(22) Filed: Sep. 14, 2019

(65) Prior Publication Data

US 2020/0097239 A1 Mar. 26, 2020

Related U.S. Application Data

(63) Continuation-in-part of application No. 16/139,002, filed on Sep. 22, 2018.

(51) Int. Cl.
| | |
|---|---|
| *G06F 3/14* | (2006.01) |
| *G06F 16/26* | (2019.01) |
| *G06T 19/00* | (2011.01) |
| *G06F 3/06* | (2006.01) |
| *G06F 9/455* | (2018.01) |

(52) U.S. Cl.
CPC ............. *G06F 3/14* (2013.01); *G06F 3/0662* (2013.01); *G06F 9/45533* (2013.01); *G06F 16/26* (2019.01); *G06T 19/00* (2013.01)

(58) Field of Classification Search
CPC ........................................................ G06F 3/14
USPC ........................................................... 718/1
See application file for complete search history.

(56) References Cited

U.S. PATENT DOCUMENTS

| | | | |
|---|---|---|---|
| 2012/0038669 A1* | 2/2012 | Lee | G06T 19/006 345/633 |
| 2013/0135344 A1* | 5/2013 | Stirbu | G06F 16/972 345/629 |
| 2016/0023404 A1* | 1/2016 | Anderson | B29C 64/393 700/119 |
| 2017/0053047 A1* | 2/2017 | McDaniel | G06F 30/17 |
| 2017/0082750 A1* | 3/2017 | Schultz | G06T 7/13 |
| 2017/0332440 A1* | 11/2017 | Xu | H04W 28/021 |
| 2017/0367771 A1* | 12/2017 | Tako | G06T 19/003 |
| 2018/0088746 A1* | 3/2018 | Cheung | G06F 3/147 |
| 2018/0136743 A1* | 5/2018 | Seegmiller | A63F 13/428 |
| 2018/0364816 A1* | 12/2018 | Krause | G06F 3/0362 |
| 2019/0026956 A1* | 1/2019 | Gausebeck | G06T 7/593 |
| 2019/0202689 A1* | 7/2019 | Jeon | B82B 3/00 |
| 2020/0097239 A1* | 3/2020 | Meouchy | G06F 16/26 |
| 2020/0098343 A1* | 3/2020 | Meouchy | G06F 3/011 |

(Continued)

*Primary Examiner* — Reza Nabi

(74) *Attorney, Agent, or Firm* — Antero Tormey Petrin; Pete Tormey

(57) ABSTRACT

A system and method for visualizing multiple datasets in a virtual 3-dimensional interactive environment. Multiple datasets may be related and virtually cast as 3-dimensional type structures. User interfaces, such as game controllers or headsets, may be used to present the dataset from differing perspectives including the appearance of moving through the data. Certain embodiments provide for mirror image views that allow for presentation of higher order datasets. Other embodiments provide for animation or motion indicia to show how the data is changing and the results on the display. The datasets may represent physical areas or virtual areas as well as demographic, sensors and financial information.

12 Claims, 7 Drawing Sheets

(56) References Cited

U.S. PATENT DOCUMENTS

2020/0302510 A1* 9/2020 Chachek ............... G06K 9/6289
2020/0363867 A1* 11/2020 Azimi .................... G06F 3/013
2021/0137398 A1* 5/2021 Park ...................... B33Y 10/00
2021/0142508 A1* 5/2021 Azimi ................... G06T 19/006
2022/0075346 A1* 3/2022 Pieper ................... B33Y 50/00

* cited by examiner

IMMERSIVE DATA VISUALIZATION

PRIORITY

This application is a continuation-in-part (CIP) of co-pending application Ser. No. 16/139,002 filed Sep. 22, 2018 which is included herein by reference as if fully set forth herein.

BACKGROUND

Virtual reality (VR) and its technical cousin augmented reality (A/R) conventionally require a human interface device (HID) to effectuate the full features of the technology. For example, a user will often wear VR goggles to see into the virtual reality world. The motion of the user is fed back to the VR system to change the display and provide the sensation of reality. Human interface devices suffer from clumsy controls and motions detracting from the full effect of the VR display. Often users require input devices with conventional triggers and push-buttons in each hand to operate even simple VR systems. These conventional controllers are throw-backs to the early days of video gaming and are of limited capabilities. As game inputs they might be acceptable, however, when using VR displays to show complex data, simple controllers are not sufficient to help a user glean valuable insights.

Humans process visual information rapidly and excel at pattern recognition. However, patterns are generally buried in data, often appearing as noise. Having the ability to "play with" the data, by continuously varying it, might allow a human user to see patterns hidden in the noise. Therefore, a way to easily alter complex data is desirable for large scale data manipulation.

SUMMARY

Disclosed herein is a system and method for visualizing multiple datasets in a virtual 3-dimensional interactive environment. Multiple datasets may be related and virtually cast as 3-dimensional type structures. User interfaces, such as game controllers or headsets, may be used to present the dataset from differing perspectives including the appearance of moving through the data. Certain embodiments provide for mirror image views that allow for presentation of higher order datasets. Other embodiments provide for animation or motion indicia to show how the data is changing and the results on the display. The datasets may represent physical areas or virtual areas as well as demographic, sensors and financial information.

By using 3-dimensional display techniques and user interactivity, datasets, correlations, and trends, hitherto unseen, may be visualized in an environment that allows for a user to easily explore the data by virtually walking through the dataset. Moreover, interactive controls allow for easy setting of visualization parameters.

Some embodiments may present actual physical locations such as datacenters or processing plants, together with real-time sensor information, to visualize real-time (or near real-time) processes.

The construction and method of operation of the invention, however, together with additional objectives and advantages thereof will be best understood from the following description of specific embodiments when read in connection with the accompanying drawings.

DESCRIPTION

Generality of Invention

Figure 1:
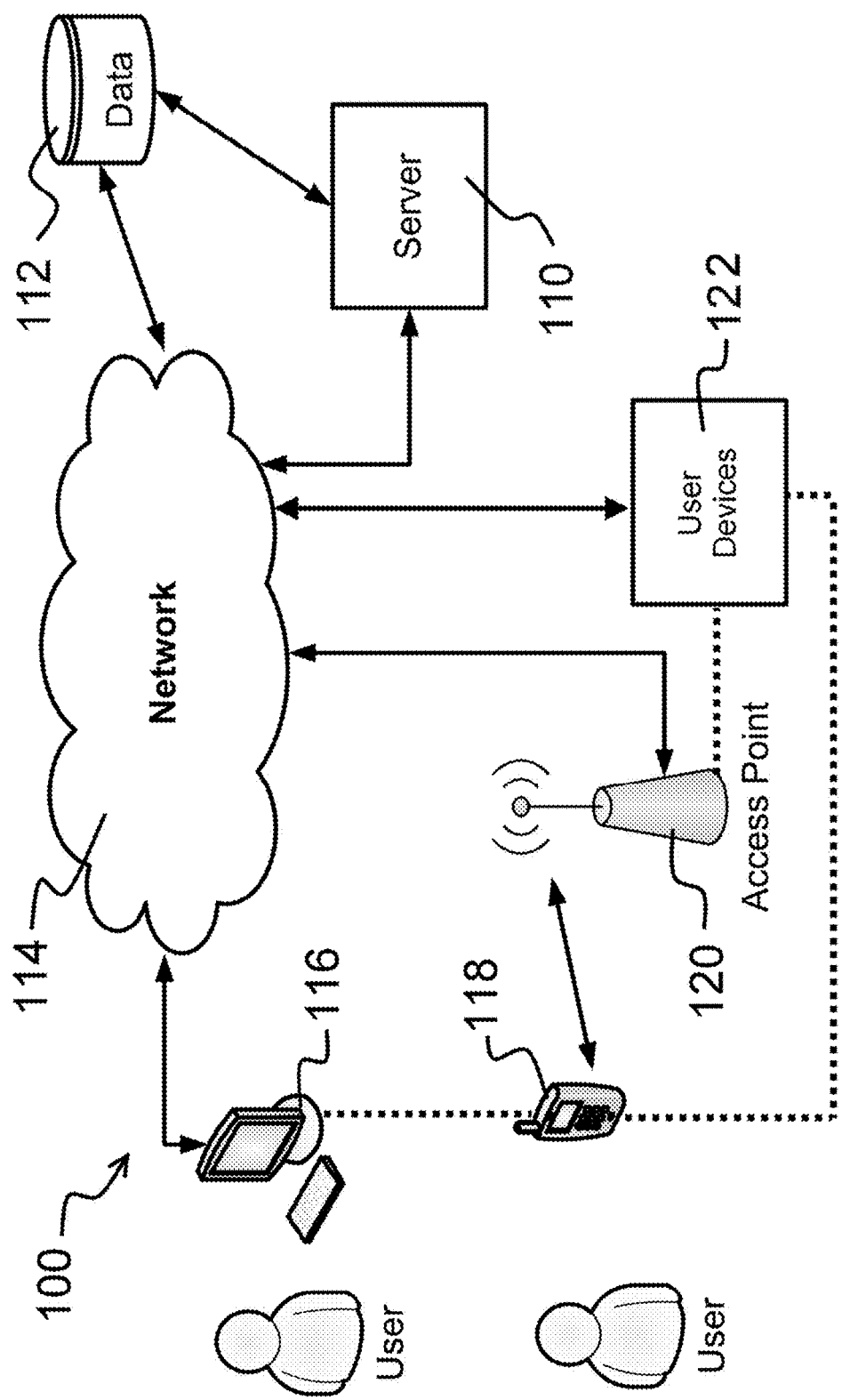
FIG. 1 shows a functional block diagram of a client server system that may be employed for some embodiments according to the current disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "Internet of Things" (or IOT) generally refers to the extension of Internet connectivity into physical devices and everyday objects. Embedded with electronics, Internet connectivity, and other forms of hardware (such as sensors), these devices can communicate and interact with others over the Internet, and they can be remotely monitored and controlled. The IOT may include, but is not limited to wireless sensor networks, control systems, automation (including home and building automation), devices and appliances (such as lighting fixtures, thermostats, home security systems and cameras, and other home appliances) smartphones and smart speakers.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "virtual machine" or "VM" generally refers to a self-contained operating environment that behaves as if it is a separate computer even though it is part of a separate computer or may be virtualized using resources form multiple computers.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.
System Elements
Processing System The methods and techniques described herein may be performed on a processor-based device. The processor-based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover, any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, Wi-Fi, Bluetooth, GPS and other I/O functionality. Alternatively, the entire processing system may be self-contained on a single device in certain embodiments.

The methods and techniques described herein may be performed on a processor-based device. The processor-based device will generally comprise a processor attached to one or more memory devices or other tools for persisting data. These memory devices will be operable to provide machine-readable instructions to the processors and to store data, including data acquired from remote servers. The processor will also be coupled to various input/output (I/O) devices for receiving input from a user or another system and for providing an output to a user or another system. These I/O devices include human interaction devices such as keyboards, touchscreens, displays, pocket pagers and terminals as well as remote connected computer systems, modems, radio transmitters and handheld personal communication devices such as cellular phones, "smart phones" and digital assistants.

The processing system may also include mass storage devices such as disk drives and flash memory modules as well as connections through I/O devices to servers containing additional storage devices and peripherals. Certain embodiments may employ multiple servers and data storage devices thus allowing for operation in a cloud or for operations drawing from multiple data sources. The inventor contemplates that the methods disclosed herein will operate over a network such as the Internet, and may be effectuated using combinations of several processing devices, memories and I/O.

The processing system may be a wireless device such as a smart phone, personal digital assistant (PDA), laptop, notebook and tablet computing devices operating through wireless networks. These wireless devices may include a processor, memory coupled to the processor, displays, keypads, Wi-Fi, Bluetooth, GPS and other I/O functionality. The processing system may be coupled to a 3D controller for interactivity. This 3D controller takes human input and provides signals directing the processing system to alter a display of information. Conventional 3D controllers may be used to virtually move through an image displayed on a screen.

Client Server Processing

FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively, the user may access the server 110 through the network 114 by using a smart device such as a telephone or PDA 118. The smart device 118 may connect to the server 110 through an access point 120 coupled to the network 114. The mobile device 118 includes a sound capture device such as a microphone.

A system as disclosed in FIG. 1 may include one or more user devices 122 coupled to the network 114 directly, through the access point 120, or directly to remote processing devices. For example, and without limitation, a virtual reality (VR), or game controller may be coupled to a processing device for getting user input. This coupling may be wireless using technologies such as Bluetooth.

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus, data to the client device may come from input data from a user, from a memory on the device, from an external memory device coupled to the device, from a radio receiver coupled to the device or from a transducer coupled to the device. The radio may be part of a wireless communications system such as a "Wi-Fi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine, a data engine, an execution engine, a user interface (UI) engine and the like may be employed. These engines may seek and gather information about events from remote data sources.

This methods and techniques in this disclosure may be effectuated using conventional programming tools including database tools for collecting, storing and searching through structured data. Moreover, web-based programming techniques may be employed to collect information, display results and allocate compensation. Accordingly, software engines may be created to effectuate these methods and techniques, either in whole or part, depending on the desired embodiment.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Operation

Figure 2:
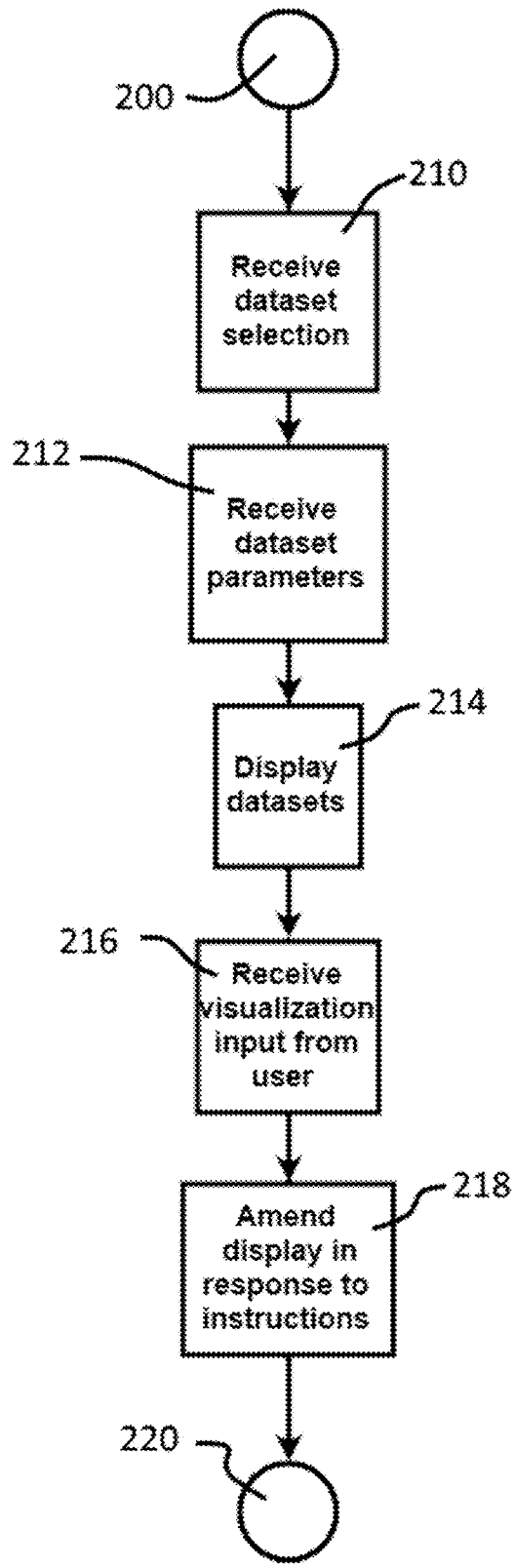
FIG. 2 illustrates a method according to some embodiments of the present disclosure.

FIG. 2 illustrates a method according to some embodiments of the present disclosure. The method begins at a flow label 200. At a step 210 a processing device receive dataset selection rom a user. The dataset may include multiple datasets from varying sources.

At a step 212 the processing device receives dataset parameters. These are initial parameters to establish how the datasets are visualized.

At a step 214 the datasets are displayed. These displays will be three-dimension (3D) representations of the datasets according to the parameters received in step 212.

At a step 216, visualization input is received from a user. The input may be from a game controller, virtual reality controller, or other input device.

At a step 218 the display changes in response to the visualization input. In a representative embodiment, the display may change to show a perspective of moving through the 3D environment. This allows for visualizing the dataset from any point of view as a user travels through the data. Moreover, with multiple datasets, the user may visualize previously unknown relationships between datasets or probe abnormalities in the dataset by visualizing correlations or from different perspectives.

In a representative embodiment, graphical user interface elements are anchored to a 3D model that represent the state of certain data analytics selected by one or more of the user inputs. For example, a slider control might be mapped to the opacity of a data layer on the processing system. As the slider is moved in one direction, the processor presents that information to the user. In turn, the processing device presents the data layer as more opaque. Alternatively, as a slide control is moved in another direction, the data layer becomes more transparent. These graphical elements may be animated for better usability, such as fading in text or moving arrows and lines. Moreover, multiple sliders may operate on separate data sets or channels to present an interactive user experience.

In some embodiments positioning controllers may be employed to provide visualization input from a user. Using positioning transducers a controller is aware of its relative position and detect when it is within a view on the mobile application and adjust its own presence or opacity or even extend virtual controls based on that state. When the user moves the controller away, the display might reflect the same data but at a different viewpoint—further away.

The data presented may include a variety of data, including, but not limited to historical, geographic, demographic, economic, environmental, and others. Certain controller operations may control traversal through these data sets including traversal though space or time. By way of example only, a button may move a virtual user forward in the display or a knob may adjust the point in time for the data being viewed.

A representative operation example may be a financial dataset. In a financial data view a user interaction could move the data analytics through different times of day or increment/decrement minutes or seconds of a timecode clock. Controls could also set the threshold of data filtering, such as the minimum price of hotel rooms, or the maximum value of a rental property visualized in a 3D display of a city. Trends in rental values may be displayed over a time frame and a dial or slider may adjust that time frame. A second data set, for example, property prices, may be overlaid and the time frame display controlled separately. In this fashion, a user may visualize a relationship between rental prices and property values that is time dependent. Moreover, a user may cycle through different modes or scenes of data.

Conventional 3D mapping techniques may be employed to effectuate certain embodiments disclosed herein. For example, and without limitation, commercially available tools for 3D visualization may be employed as part of certain embodiments. Different datasets may employ different modeling technologies to optimize data visualization and 3D interactivity. Moreover, dataset animation may be simulated by rapidly plotting datasets in succession.

Alternative Embodiments

Graphical user interface elements may be anchored to a 3D visualization that represent the state of the selected data analytics. For example, and without limitation, a slider could be mapped to the opacity of a data layer. As the slider is moved up, the data layer threshold level may change and the dataset becomes more opaque; conversely, as it is moved down, the layer becomes more transparent. These graphical elements may animate for better usability, such as fading in text or moving arrows and lines. In the slider layer example, the actual opacity value, a percentage, could be drawn on the slider knob itself as it is being slid, and then disappear 2 seconds after the user has finished moving the slider. Thus, the graphical interface elements show the state of the data as well as the state of the controller's buttons and other components.

Data Capture

When an image is taken using a portable camera such as a smartphone, metadata fields may be attached to it. These fields may include the model of the camera, the time it was taken, whether the flash was used, the shutter speed, focal length, light value and the location information provided by a GPS receiver. Accordingly, collections of images may be used to map out a space such as an office environment. The office space may then be visualized from many perspectives providing the viewer with a 3D replication of the space and allowing the viewer to transverse the space using convention controls such as joysticks, 3D controllers, keyboards and the like. Collected with the images may be other sensor data such as WiFi signal strength, cellular signal strength, GPS signal information and the like.

Correlating the sensor data with the image data allows for presenting a multi-variable view of a physical space together with the sensors data, thus showing the sense data in relation to the physical space.

Figure 3:
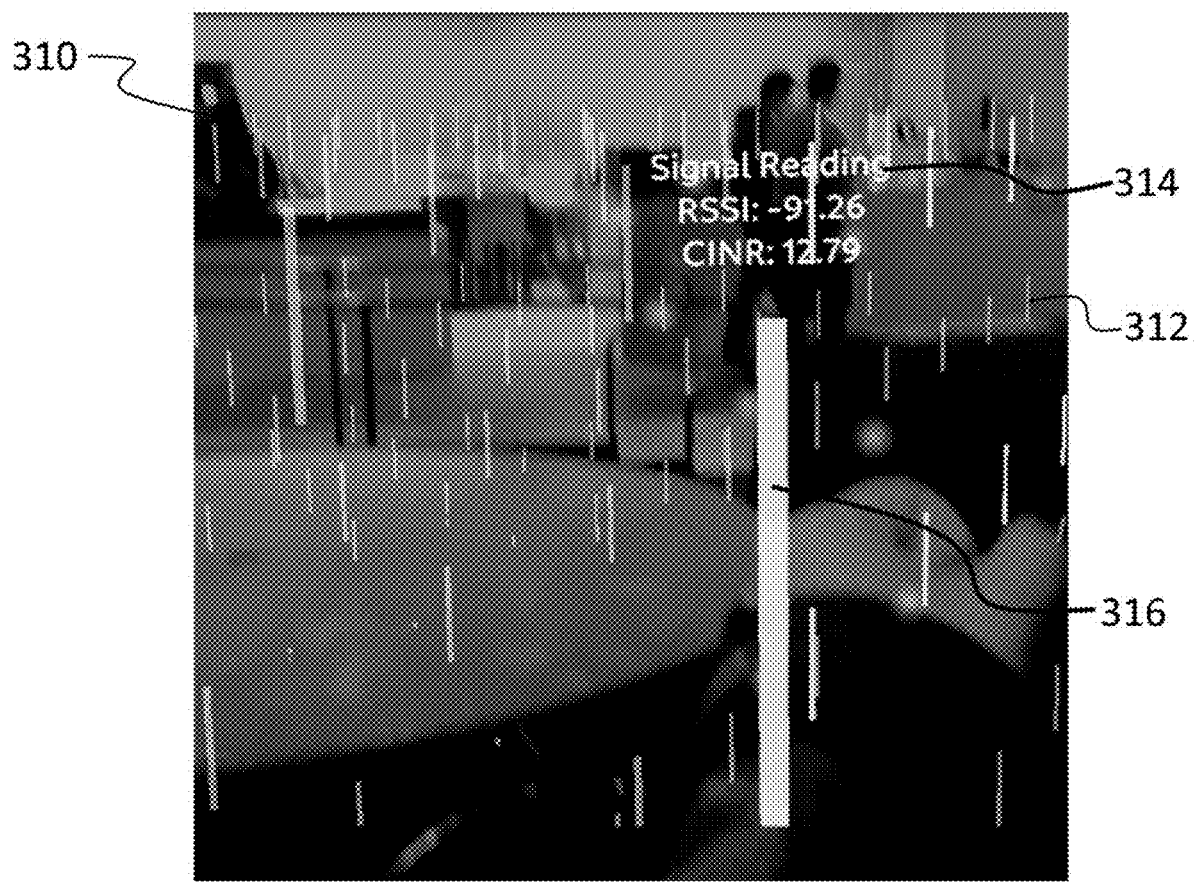
FIG. 3 shows an image of an office environment overlaid with received signal strength indicators (RSSI).

FIG. 3 shows an image of an office environment 310 overlaid with received signal strength indicators (RSSI) 312. The RSSI is projected into the image showing relative signal strength thus showing the signal strength for the office space in different locations. Animating the visual allows for a viewer to see the signal strength from different perspectives, visually identifying areas of good single strength and week signal strength. In some embodiments color may be used to compare signal strength from different communication system. This identification is easy, using the view shown, for a user to understand compared to conventional graphical techniques. Selected RSSI 316 may be highlighted and numerical values 314 presented on the display to provide more concrete information about the presentation.

Figure 4:
FIG. 4 shows an image of an office environment 410 with received signal strength indicators 412 and event history location 414.

FIG. 4 shows an image of an office environment 410 with received signal strength indicators 412 and event history location 414. These three layers of data, displayed as a 3D image, allow greater visualization. As show in FIG. 4 the event history location 414 includes information on cellular signal strength and dropped calls. This information may be collected from a user whenever a call is dropped by an application that allows for a user to detect a dropped call and send the GPS information to a data store. The indicia representing the dropped calls may be spherical as shown with a size proportional to the amount of calls dropped, the time of a dropped call, or other pertinent information. In some embodiments the indicia may be a graphical representation of the type of information being displayed. For example, and without limitation, the indicia may be an image of a cell phone.

Figure 5:
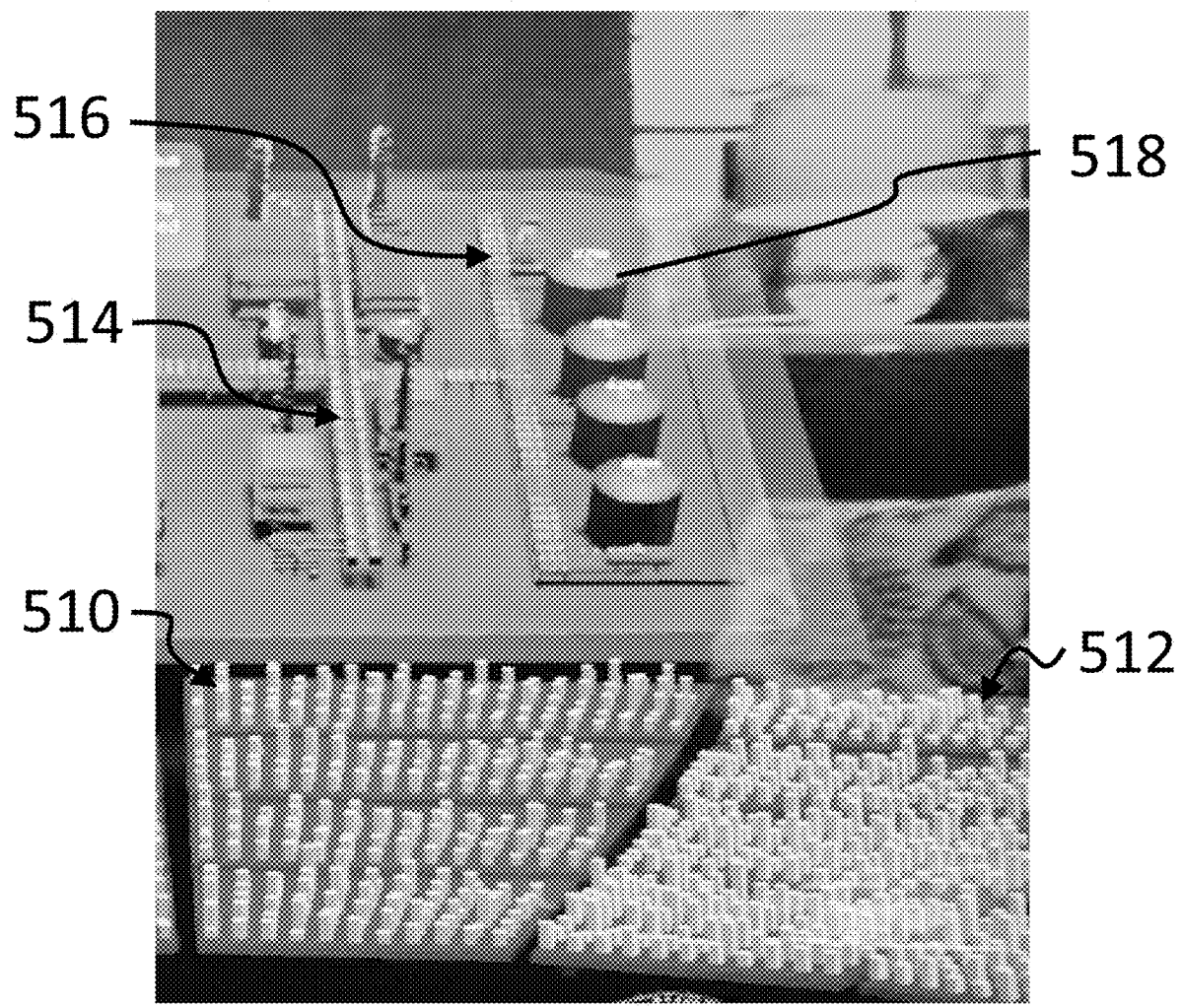
FIG. 5 shows a representation of multiple datasets presented as a 3D image overlay.

FIG. 5 shows a representation of multiple datasets presented as a 3D image overlay. In FIG. 5 a visualization of an oil processing facility 514 is shown as seen through a virtual or augmented reality headset. Oil processing facilities including storage tanks 518 and pipelines 516 are configured with sensors 514. These sensors may sense a variety of properties such as pressure, temperature, flow rate, pH, and the like. Below the image of the processing facility are a series of graphical representations 510 and 512. These representations indicate the value of the related sensor and may provide real-time or near real-time information. For example, and without limitation, a sensor bank 510 may indicate temperature for various pipelines, while the display 512 may indicate flow rate for the same or a different pipeline. The sensor data is presented in a graphical array, however, in some embodiments the graphical data may be presented mapped-out to conform with the processing plan physical layout. In certain embodiments color may be used to show related industries or transactions.

In operation, a user controlling a graphical user interface may "move" through the image on the display including the graphical data presentation. While shown in "stadium mode" other display modes may allow a user to move to a particular area of the facility and quickly visualize information that historically has been represented numerically. Thus a facility operator may be able to monitor plant operation visually.

The presentation in FIG. 5 may be animated to show changes over time. For example, and without limitation, hourly (or yearly) sensors values may be displayed while a user moves through the dataspace. Uniquely a display as shown in FIG. 5 may show correlations between processing facilities as movement in 3D space which are hitherto imperceptible using conventional charting techniques.

Figure 6:
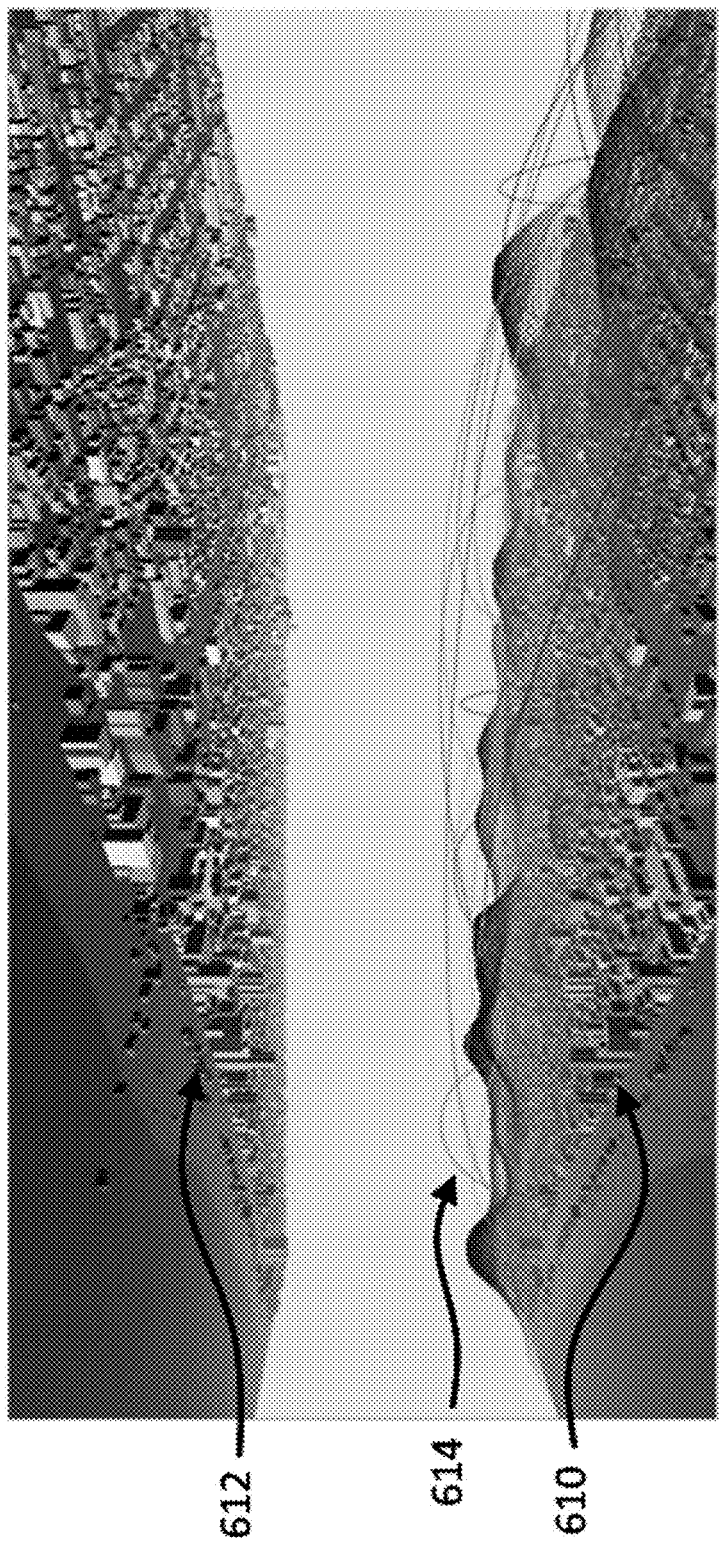
FIG. 6 shows a representation of multiple datasets presented as overlaid 3D images.

FIG. 6 shows a representation of multiple datasets presented as overlaid 3D images. In FIG. 6 geospatial information is presented using multiple datasets to present a 3D image space. In FIG. 6 a first dataset is presented showing a topography and related parameters 610. In the example shown, 610 points to buildings with heights corresponding to residential density.

Projected as a mirror image above the bottom image is a similar geospatial representation except the underlining data parameter 612 is different. Here 612 represents tax income from the properties allowing a user to easily see tax revenue and population density correlations. Further displayed are trajectory lines 614 showing movement of data. For example, and without limitation population movement may be displayed. If animated, population trajectory may be display along with changes in population density and tax revenue. A user may enter the 3D visualization and interact from a wide range of perspectives.

In certain embodiments utility poles, buildings, power lines, oil and gas lines, telecom cell towers, street lights, and the like may be displayed. Overlay data may include county tax records, cell phone radio measurements, transportation lines, store sales, and so on. All the data is interactive using a data controller.

Topography similar to those shown in the figures may be used to effect a visualization of a network. This may include real-time traffic to nodes (routers, access points, users, and the like), connections between nodes, connection quality and similar attributes. Moreover, geospatial information may be projected using mirror imaging as show to visualize network in relation to actual space. A user may then move through the data to locate problem areas or to identify suggestions to new data pathways.

Figure 7:
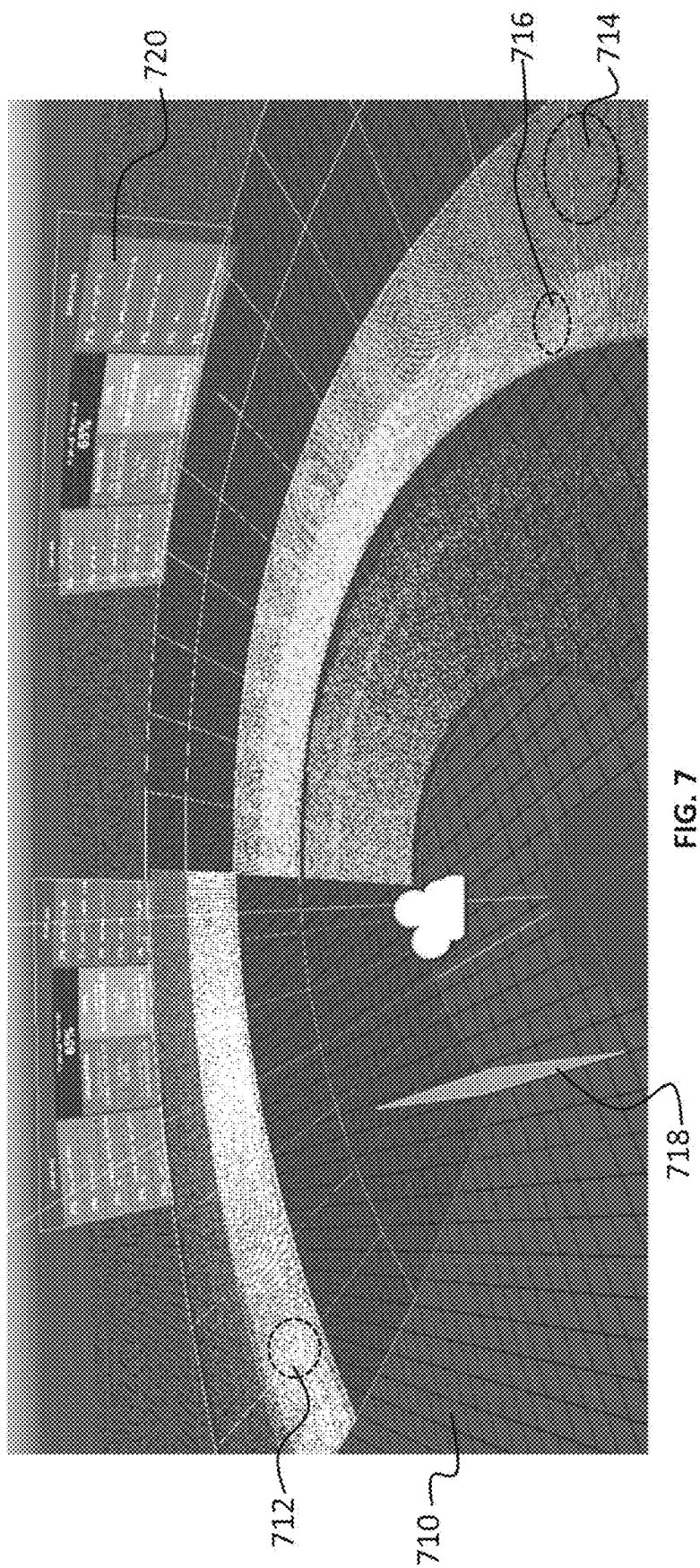
FIG. 7 shows data using a person-centric 3-dimensional view as in a stadium.

FIG. 7 shows data using a person-centric 3-dimensional view as in a stadium 710. In FIG. 7 the "audience" may be divided into categories 712, 714, and 716 such as the applicants for loans, or all the customers of an insurance company, or all the customers who have bought products from a store. The people are 'sitting' in a 'data stadium' 710 and move around the stadium depending on user-defined filters or adjustments. In the example of the finance company, a data controller may adjust the approval threshold for loans, so many of the people in the stadium would move to the back sections indicating they were no longer approved for the loan or move to the front when they were approved depending on user input. This is also to be used for analyzing sales data, for example, and without limitation, bringing all your customers into the stadium and selecting the biggest spenders to "sit" in the front seats and the lowest spenders in the back seats. A user may then filter all sales just by a single product line to visualize the biggest spenders.

A user may move through the 3D space using a controller to reposition the user with respect to the data. An indicator 718 may show the user their direction of travel. Displays, virtually presented on the walls of the stadium may be used to present to a user numeric or other related information to the display.

Software engines may be implemented to provide particular functionality as described herein. For example, and without limitation, a data engine may be employed to retrieve data form varying structured data stores which then will be transferred to a display engine for displaying according to user instructions. An interface engine, which may be coupled to a remote controller, may provide for control to let a user determine how to view the data or to transverse through the data as displayed.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A method of data visualization within a graphical user interface including:
   receiving at a server a first data source information;
   receiving at the server a second data source information;
   graphically representing the first data source information as a first three-dimensional structure;
   graphically representing the second data source information as a second three-dimensional structure;
   displaying the first and second three-dimensional structure on a wearable display device at a first perspective;
   receiving a user input associated with the display device, and
   altering the first perspective to present a second perspective on the display device,
   wherein the wearable display device is either a virtual reality headset or an augmented reality headset, wherein elements of the graphical user interface anchored to a 3D visualization data that represents state of the selected data analytics, wherein the graphical user interface comprises at least a slider knob that mapped to the opacity of the a data layer, wherein an actual opacity value or a percentage is displayed on the slider knob itself as it is being slid and then disappear after a threshold time elapsed from the time user finished moving the slider knob.

2. The method of claim 1 wherein the first data source includes financial information and the second data source include geographic information.

3. The method of claim 1 wherein the first data source includes demographic information and the second data source includes geographic information.

4. The method of claim 1 wherein the wearable display device is a smart phone.

5. The method of claim 1 wherein the first data set includes a physical structure information and the second data set includes sensor information associated with the physical structure.

6. A processor-readable storage device encoded with non-transitory processor instructions directing the processor to perform a method within a graphical user interface including:
   receiving over a network a first data source information;
   receiving a second data source information;
   graphically representing the first data source information as a first three-dimensional structure;

graphically representing the second data source information as a second three-dimensional structure;

displaying the first and second three-dimensional structure on a wearable display device at a first perspective;

receiving a user input associated with the display device, and altering the first perspective to present a second perspective on the display device, wherein the wearable display device is either a virtual reality headset or an augmented reality headset, wherein elements of the graphical user interface anchored to a 3D visualization data that represents state of the selected data analytics, wherein the graphical user interface comprises at least a slider knob that mapped to the opacity of the a data layer, wherein an actual opacity value or a percentage is displayed on the slider knob itself as it is being slid and then disappear after a threshold time elapsed from the time user finished moving the slider knob.

7. The device of claim 6 wherein the first data source includes financial information and the second data source include geographic information.

8. The device of claim 6 wherein the first data source includes demographic information and the second data source includes geographic information.

9. The device of claim 6 wherein the wearable display device is a smart phone.

10. A system including:

a processor;

a data engine operable to read multiple data sources;

a display engine within a graphical user interface operable to transform data from the data engine into one or more 3D models;

a display device operable to present the one or more 3D models on a wearable display;

a user input device associated with the display device, wherein the one or more 3D models are altered in response to information from the user input device, wherein the wearable display device is either a virtual reality headset or an augmented reality headset, wherein elements of the graphical user interface anchored to a 3D visualization data that represents state of the selected data analytics, wherein the graphical user interface comprises at least a slider knob that mapped to the opacity of the a data layer, wherein an actual opacity value or a percentage is displayed on the slider knob itself as it is being slid and then disappear after a threshold time elapsed from the time user finished moving the slider knob.

11. The system of claim 10 wherein the multiple data sources include financial information and geographic information.

12. The system of claim 10 wherein the multiple data sources include demographic information and geographic information.

* * * * *